(12) United States Patent
Uramoto (10) Patent No.: US 9,829,734 B2
(45) Date of Patent: Nov. 28, 2017

(54) LIQUID CRYSTAL DISPLAY PANEL

(71) Applicant: Japan Display Inc., Minato-ku (JP)

(72) Inventor: Seiichi Uramoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 336 days.

(21) Appl. No.: 14/569,982

(22) Filed: Dec. 15, 2014

(65) Prior Publication Data

US 2015/0177578 A1 Jun. 25, 2015

(30) Foreign Application Priority Data

Dec. 20, 2013 (JP) ................................ 2013-263853

(51) Int. Cl.
*G02F 1/1343* (2006.01)
*G02F 1/1333* (2006.01)
*G02F 1/1368* (2006.01)
*G02F 1/1362* (2006.01)

(52) U.S. Cl.
CPC .. *G02F 1/133345* (2013.01); *G02F 1/134363* (2013.01); *G02F 2001/13685* (2013.01); *G02F 2001/134372* (2013.01); *G02F 2001/136218* (2013.01)

(58) Field of Classification Search
CPC .............. G02F 1/134363; G02F 2001/134372
See application file for complete search history.

(56) References Cited

U.S. PATENT DOCUMENTS

| 2003/0133053 | A1 | 7/2003 | Ono et al. | |
|---|---|---|---|---|
| 2009/0103025 | A1* | 4/2009 | Tanno | G02F 1/134363 349/110 |
| 2009/0122247 | A1* | 5/2009 | Chang | G02F 1/134363 349/139 |
| 2009/0207366 | A1* | 8/2009 | Kim | G02F 1/134363 349/147 |
| 2009/0225250 | A1* | 9/2009 | Lyu | G02F 1/134363 349/44 |
| 2009/0296030 | A1 | 12/2009 | Ikebe | |

FOREIGN PATENT DOCUMENTS

| JP | 2003-207796 | | 7/2003 |
|---|---|---|---|
| JP | 2006-317516 | A | 11/2006 |
| JP | 2009-288372 | A | 12/2009 |
| JP | 2009-288373 | | 12/2009 |
| JP | 2013-127558 | A | 6/2013 |
| JP | 2013-186466 | A | 9/2013 |

OTHER PUBLICATIONS

Office Action dated Aug. 1, 2017, in Japanese Patent Application No. 2013-263853, filed Dec. 20, 2013 (with English-language translation).

\* cited by examiner

*Primary Examiner* — Wen-Ying P Chen
(74) *Attorney, Agent, or Firm* — Oblon, McClelland, Maier & Neustadt, L.L.P.

(57) ABSTRACT

According to one embodiment, a liquid crystal display device includes an array substrate, a counter-substrate and a liquid crystal layer. The array substrate includes a common electrode, an insulating film, a first pixel electrode, a second pixel electrode and a shield electrode. The insulating film is provided on the common electrode. The first pixel electrode and the second pixel electrode are provided on the insulating film and located with an interval therebetween. The shield electrode is provided on the insulating film and located between the first pixel electrode and the second pixel electrode.

8 Claims, 9 Drawing Sheets

FIG. 11 is based upon and claims the benefit of
LIQUID CRYSTAL DISPLAY PANEL

CROSS-REFERENCE TO RELATED APPLICATIONS

This application is based upon and claims the benefit of priority from Japanese Patent Application No. 2013-263853, filed Dec. 20, 2013, the entire contents of which are incorporated herein by reference.

FIELD

Embodiments described herein relate generally to a liquid crystal display panel.

BACKGROUND

A liquid crystal display device is incorporated in various devices such as a television receiver, an in-vehicle display such as a car navigation device, and a mobile device such as a notebook personal computer or a mobile phone.

For example, in a liquid crystal display device of a twisted nematic (TN) mode and an optically compensated bend (OCB) mode, an electric field formed between a counter-electrode provided on an upper substrate and a pixel electrode provided on a lower substrate controls the alignment direction of a liquid crystal molecule included in a liquid crystal layer which is held between both substrates.

Also, in a liquid crystal display device which utilizes an in-plane switching (IPS) mode, both a counter-electrode (COM electrode, in this case) and a pixel electrode are provided on either substrate to control the alignment direction of a liquid crystal molecule included in a liquid crystal layer by a lateral electric field formed between both electrodes (including an oblique electric field and a fringe electric field). A liquid crystal display device which utilizes a fringe-field switching (FFS) mode as one aspect of an IPS mode has excellent viewing angle property and high luminance since the device can secure a high aperture ratio.

DETAILED DESCRIPTION

In general, according to one embodiment, there is provided a liquid crystal display device comprising: an array substrate comprising a common electrode, an insulating film provided on the common electrode, a first pixel electrode provided on the insulating film, a second pixel electrode provided on the insulating film and located with an interval between the first pixel electrode and the second pixel electrode, and a shield electrode provided on the insulating film and located between the first pixel electrode and the second pixel electrode; a counter-substrate arranged opposite to the array substrate; and a liquid crystal layer held between the array substrate and the counter-substrate, wherein the first pixel electrode and the second pixel electrode are configured to apply to the liquid crystal layer an electric field formed between each pixel electrode and the common electrode.

According to another embodiment, there is provided a liquid crystal display device comprising: an array substrate comprising a first pixel electrode, a second pixel electrode located with an interval between the first pixel electrode and the second pixel electrode, an insulating film provided on the first pixel electrode and the second pixel electrode, a common electrode which includes a first electrode portion and a second electrode portion set to a same potential and is provided on the insulating film, the first electrode portion facing the first pixel electrode and the second electrode portion facing the second pixel electrode, and a shield electrode provided on the insulating film and located between the first electrode portion and the second electrode portion; a counter-substrate arranged opposite to the array substrate; and a liquid crystal layer held between the array substrate and the counter-substrate, wherein the first pixel electrode is configured to apply to the liquid crystal layer an electric field formed between the first pixel electrode and the first electrode portion, and the second pixel electrode is configured to apply to the liquid crystal layer an electric field formed between the second pixel electrode and the second electrode portion.

According to another embodiment, there is provided a liquid crystal display device comprising: an array substrate comprising an insulating film, a first pixel electrode provided on the insulating film, a second pixel electrode provided on the insulating film and located with an interval between the first pixel electrode and the second pixel electrode, a common electrode which includes a first electrode portion and a second electrode portion set to a same potential and is provided on the insulating film, and a shield electrode provided on the insulating film and located between a first electrode group which includes the first pixel electrode and the first electrode portion and a second electrode group which includes the second pixel electrode and the second electrode portion; a counter-substrate arranged opposite to the array substrate; and a liquid crystal layer held between the array substrate and the counter-substrate, wherein the first pixel electrode is configured to apply to the liquid crystal layer an electric field formed between the first pixel electrode and the first electrode portion, and the second pixel electrode is configured to apply to the liquid crystal layer an electric field formed between the second pixel electrode and the second electrode portion.

Embodiments of the present invention will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

To begin with, the basic concept of the embodiments of the present invention will be described.

A liquid crystal display device comprises an array substrate, a counter-substrate and a liquid crystal layer. A liquid crystal display device forms a plurality of pixels in a matrix arranged along a row direction and a column direction. In a liquid crystal display device of an in-plane switching (IPS) mode, each pixel has a pixel electrode and a common electrode (a part of a common electrode). In an on-state pixel, an electric field formed between the pixel electrode and the common electrode is applied to the liquid crystal layer.

Among a plurality of pixels, an optional pair of pixels neighboring with each other is referred to as a first pixel and a second pixel. In the liquid crystal layer, a region which forms the first pixel is referred to as a first liquid crystal layer and a region which forms the second pixel is referred to as a second liquid crystal layer. For example, when the first pixel becomes on-state, an electric field formed between the pixel electrode and the common electrode in a pixel is applied to the first liquid crystal layer.

An electric field can be formed not only between the pixel electrode of the first pixel and the common electrode of the same pixel but also between the pixel electrode of the first pixel and other members. For example, an electric field can leak from the first pixel in an on-state to the second liquid crystal layer. When an electric field is leaked to the second liquid crystal layer, the alignment of the liquid crystal molecule of the second liquid crystal layer is disturbed, which affects a normal image of the second pixel.

Specifically, in a normally black liquid crystal display device, there is a concern that light leakage can occur in the second pixel in an off-state. There is also a concern that non-uniformity in color mixture can occur when the first pixel and the second pixel display images whose color differs from each other. For example, when the first pixel in an on-state is supposed to normally display a red image and the second pixel in an off-state is supposed to undesirably display a green image, not a red image but an image in which green is mixed in red is supposed to be displayed.

Therefore, a liquid crystal display device which utilizes an IPS mode and has excellent display quality is desired. For example, there is desired a technique which makes the first pixel have no influence on the display operation of the second pixel when the first pixel is in an on-state and the second pixel is in an off-state.

For the above-mentioned technique, it is possible to take as an example a technique which makes the distance between the pixel electrode of the first pixel and the pixel electrode of the second pixel exceed a specific value.

However, in this case, there is a problem that the distance between the pixel electrodes is restricted. The pixel size is thereby restricted, resulting in the decrease in the definition of a pixel. It is of course difficult to increase the definition of a pixel. If the size of the pixel electrode itself is reduced, it is possible to contribute to high definition. However, in this case, it is possible that a domain where the alignment control of a liquid crystal molecule is insufficient exists. Since it becomes difficult to secure a high aperture ratio and a high luminance, it becomes impossible to obtain an advantage of a liquid crystal display device of an IPS mode.

As understood from the above, since there is restriction on the pixel electrode, it is difficult to obtain a liquid crystal display device which utilizes an IPS mode and has excellent display quality without decreasing the definition of a pixel and impairing the advantage of an IPS mode.

In the embodiment of the present invention, a liquid crystal display device which utilizes an IPS mode and has excellent display quality without receiving the above-mentioned restriction on the pixel electrode can be obtained, so that above problem can be solved. Next, the means and method for solving the above problem will be described.

Figure 1:
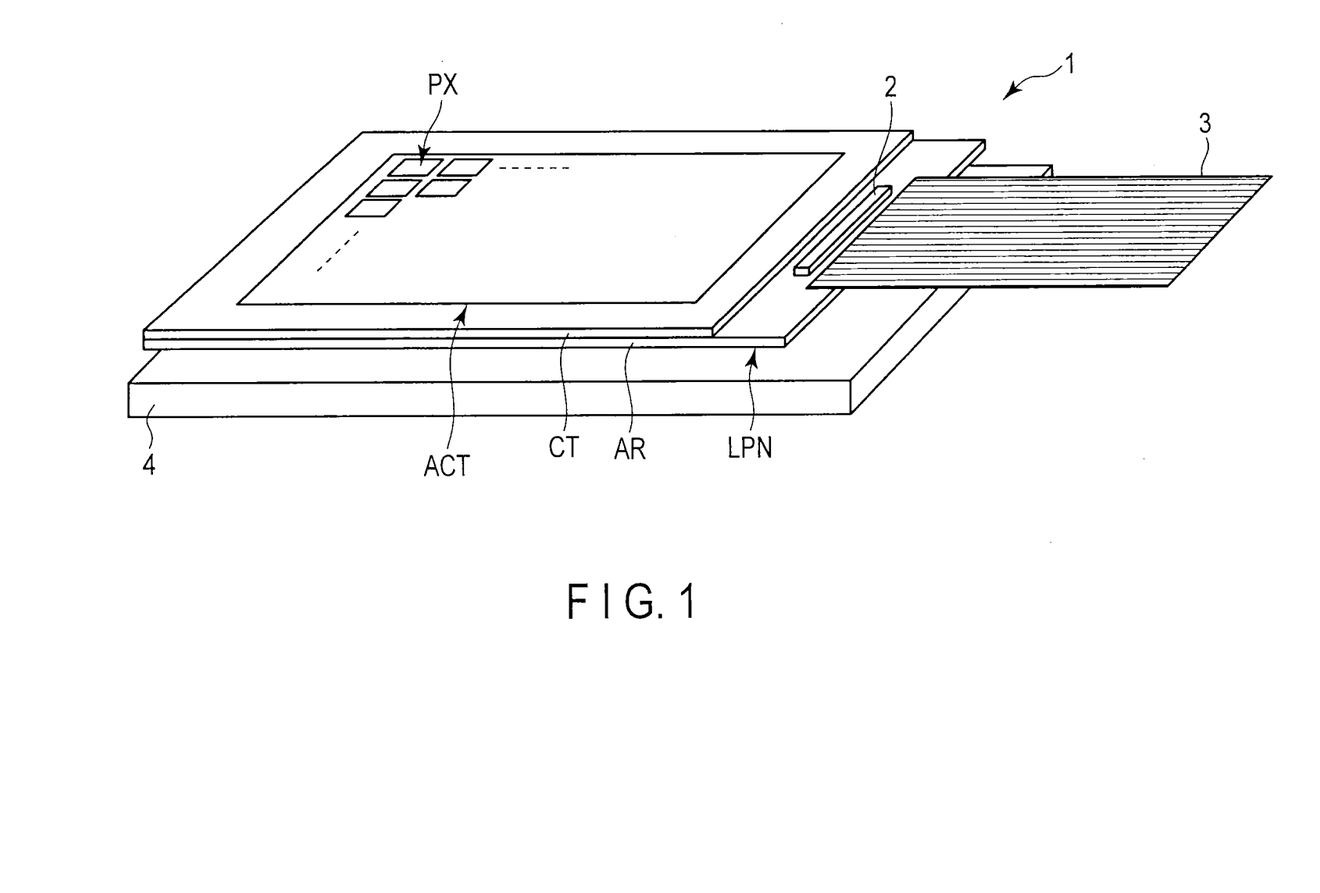
FIG. 1 is a perspective view schematically illustrating a structure of a liquid crystal display device of a first embodiment.

The liquid crystal display device of the first embodiment will be hereinafter described in detail with reference to the accompanying drawings. FIG. 1 is a perspective view schematically illustrating a structure of a liquid crystal display device of a first embodiment.

As shown in FIG. 1, a liquid crystal display device 1 comprises an active matrix liquid crystal display panel LPN, a backlight unit 4 which illuminates the liquid crystal display panel LPN, etc. In the example shown, the liquid crystal display device 1 comprises a driver IC 2 and a flexible printed circuit 3 as a signal source necessary for driving the liquid crystal display panel LPN.

The liquid crystal display panel LPN is a normally black liquid crystal display panel. The liquid crystal display panel LPN comprises an array substrate AR, a counter-substrate CT which is arranged opposite to the array substrate AR, and a liquid crystal layer (liquid crystal layer LQ described below) which is held between the array substrate AR and the counter-substrate CT. The liquid crystal display panel LPN comprises an active area (display area) ACT which displays an image. In the active area ACT, a plurality of pixels PXs are arrayed in a matrix of m×n in a column direction and a row direction (m and n are positive integers).

The backlight unit 4 is arranged on the back side of the array substrate AR. Various forms are applicable to the backlight unit 4. Also, any of a unit using as a light source a light-emitting diode (LED), a unit using a cold cathode fluorescent lamp (CCFL), etc, is applicable. The explanation of the detailed structure will be omitted.

Figure 2:
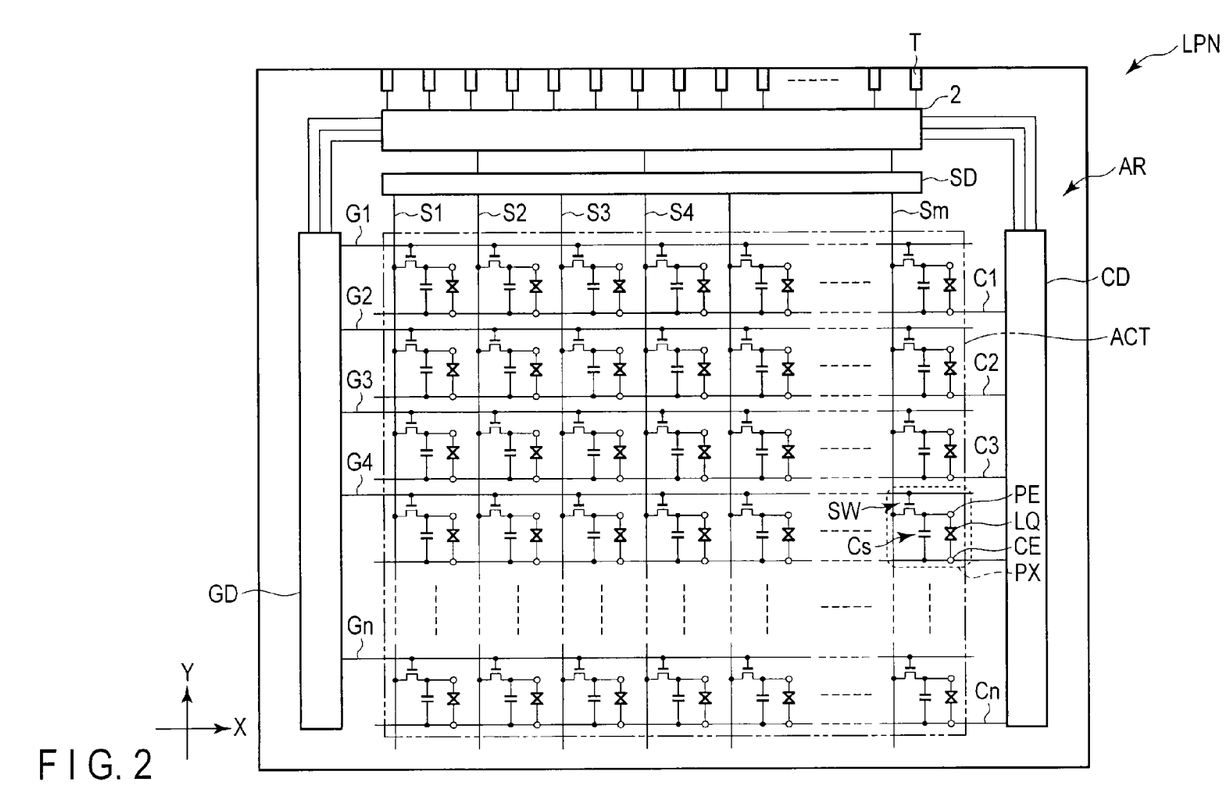
FIG. 2 is a view schematically illustrating a structure and an equivalent circuit of a liquid crystal display panel shown in FIG. 1.

FIG. 2 is a view schematically illustrating a structure and an equivalent circuit of the liquid crystal display panel LPN shown in FIG. 1.

As shown in FIG. 2, the array substrate AR comprises, in the active area ACT, n gate lines G (G1-Gn), n capacitance lines C (C1-Cn), m source lines S (S1-Sm), m×n switching elements SWs each of which is electrically connected to the gate line G and the source line S, m×n pixel electrodes PEs each of which is electrically connected to the switching element SW, a common electrode CE which is a part of the capacitance line C and faces the pixel electrode PE, etc. A storage capacitance Cs is formed between the capacitance line C and the pixel electrode PE.

Each gate line G is extracted outside the active area ACT and is connected to a first driver GD. Each source line S is extracted outside the active area ACT and is connected to a second driver SD. Each capacitance line C is extracted outside the active area ACT and is connected to a third driver CD. The first driver GD, the second driver SD and the third driver CD are formed on the array substrate AR and are connected to the driver IC 2. In the example shown, the driver IC 2 is mounted on the array substrate AR in a non-display area (frame area) outside the active area ACT of the liquid crystal display panel LPN. Note that in some liquid crystal drive modes, when there is no need to drive the capacitance line C, the third driver CD is not particularly needed and each capacitance line C may be set to a certain constant potential.

Also, the liquid crystal display panel LPN of the example shown comprises the pixel electrode PE and the common electrode CE in the array substrate AR and adopts a fringe-field switching (FFS) mode of switching liquid crystal molecules of the liquid crystal layer LQ, mainly by means of a lateral electric field formed between the pixel electrode PE and the common electrode CE (especially, an electric field substantially parallel to the main surface of a substrate, in the fringe electric field).

Figure 3:
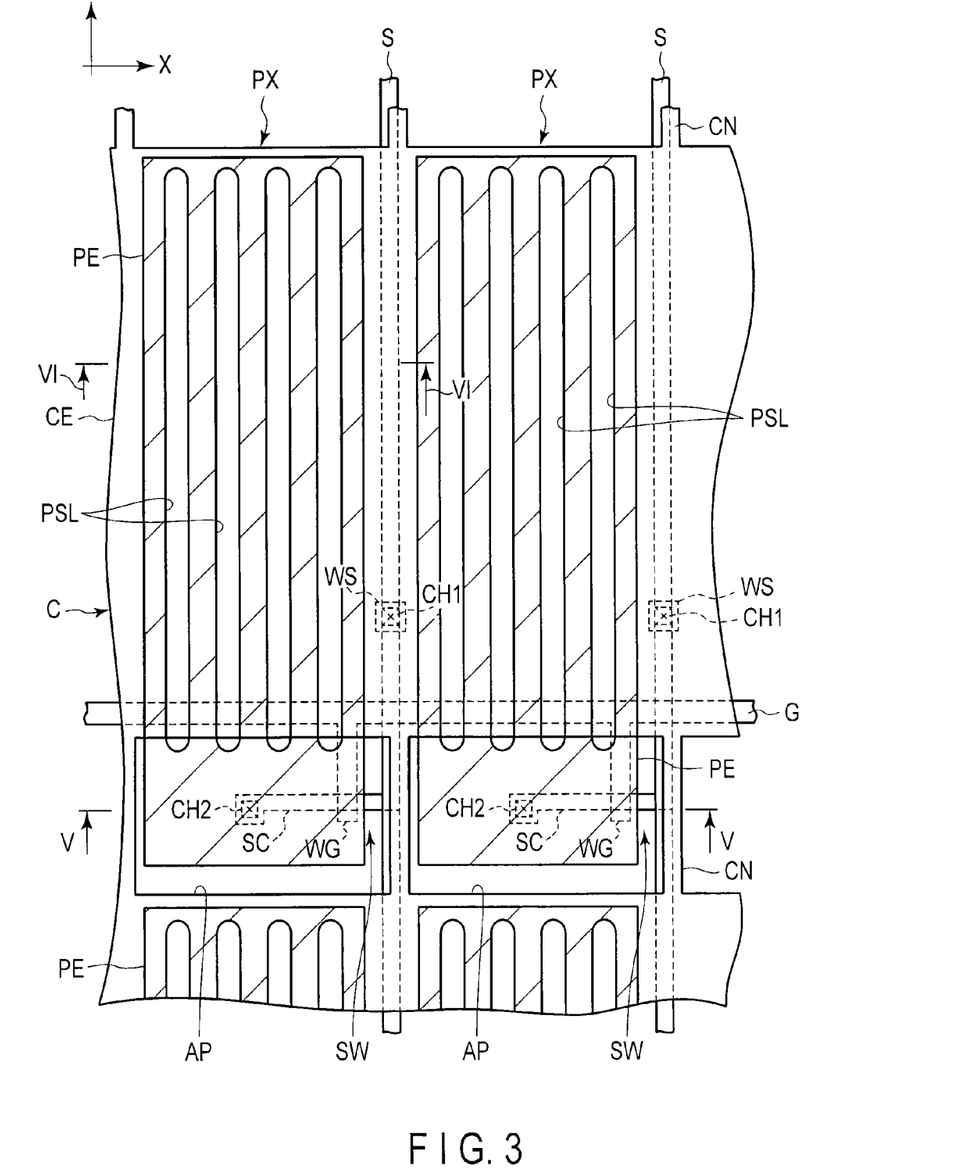
FIG. 3 is a schematic plan view illustrating a structure of a pixel in an array substrate shown in FIGS. 1 and 2, as viewed from a counter-substrate side.
Figure 4:
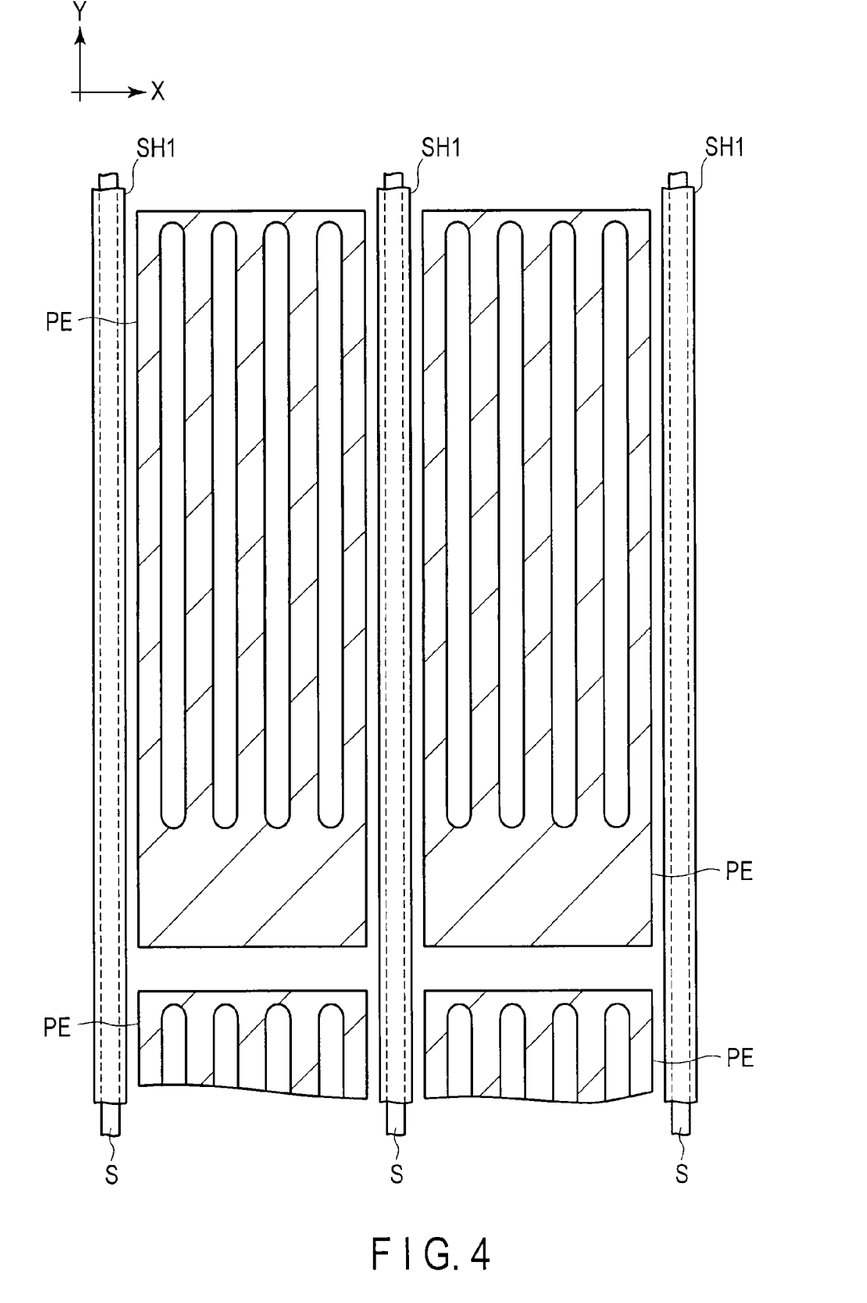
FIG. 4 is a schematic plan view of the array substrate, as viewed from the counter-substrate side, and a view illustrating that a source line, a pixel electrode and a shield electrode are extracted.

FIG. 3 is a schematic plan view illustrating the structure of the pixel PX in the array substrate AR shown in FIG. 2, as viewed from the side of the counter-substrate CT. Note that a shield electrode SH1 is not shown in FIG. 3. Also, the plan view shown here is merely an example of a pixel layout and the present embodiment is not limited thereto. FIG. 4 is a schematic plan view of the array substrate AR, as viewed from the side of the counter-substrate CT, and a view illustrating that the source line S, the pixel electrode PE (shown in FIG. 3) and the shield electrode SH1 (not shown in FIG. 3) are extracted. In the following, only the portions necessary for explanation are shown in the drawings.

As shown in FIGS. 3 and 4, the gate line G extends in a row direction X. The source line S extends in a column direction Y which intersects the row direction X. The switching element SW is arranged near the intersection between the gate line G and the source line S and is configured by, for example, a thin-film transistor (TFT). The switching element SW comprises a semiconductor layer SC which uses polycrystalline silicon. While FIG. 3 particularly shows the example of a structure configured by a top-gate TFT, a TFT may be configured by a bottom gate, and amorphous silicon and an oxide semiconductor may be used as a semiconductor layer.

A gate electrode WG of the switching element SW is located directly on the semiconductor layer SC and is electrically connected to the gate line G (in the example shown, the gate electrode WG is formed integrally with the gate line G). Note that the gate line G is also located directly on the semiconductor layer SC. Therefore, the switching element SW is formed by a double-gate TFT. A source electrode WS of the switching element SW is electrically connected to the source line S (in the example shown, the source electrode WS is formed integrally with the source line S). The source electrode WS is connected to the source region of the semiconductor layer SC through a contact hole CH1.

The capacitance line C includes the common electrode CE which is formed in common over the plurality of pixels PXs. That is, the common electrode CE is arranged in each pixel PX, extends above the source line S, and is formed in common over each of the pixels PXs neighboring in the row direction X and each of the pixels PXs neighboring in the column direction Y. The common electrode CE is formed in, for example, a substantially rectangular shape in each pixel PX. The common electrode CE is set to, for example, a common potential (for example, 0V).

The pixel electrode PE is formed in, for example, a substantially rectangular shape in each pixel PX in which a length along the row direction X is shorter than a length along the column direction Y. The pixel electrode PE has a long axis parallel to the column direction Y. The pixel electrode PE is arranged above the common electrode CE. Also, the pixel electrode PE is electrically connected to the source region of the semiconductor layer SC via a relay electrode RE and a drain electrode WD which will be described later. The pixel electrode PE is thereby electrically connected to the switching element SW. The shape of the pixel electrode PE may be a shape having a bend portion in an axial direction either of a long axis or a short axis, in addition to the substantially rectangular shape shown in FIG. 3.

Regarding the common electrode CE, a rectangular aperture AP is formed in a contact region where the drain electrode WD and the pixel electrode PE are electrically connected. The relay electrode RE is formed inside the aperture AP. A cyclic gap region is formed between the relay electrode RE and the common electrode CE. The common electrode CE which is arranged corresponding to pixels neighboring the column direction Y is electrically connected by a connecting portion CN which extends along the column direction Y. The connecting portion CN is a part of a capacitance line. The connecting portion CN is arranged between the relay electrodes REs which neighbor the row direction X. While the relay electrode RE is provided in order to make a better connection between the drain electrode WD and the pixel electrode PE, the relay electrode RE may not be necessarily provided in some manufacturing processes.

Also, a plurality of slits PSLs which face the common electrode CE are formed in the pixel electrode PE. While one pixel electrode PE has four slits PSLs in the example shown, in a setting where a pixel pitch along the row direction X is narrower, one pixel electrode PE may have approximately two slits PSLs since the length along the row direction X of the pixel PX becomes shorter and the length along the row direction X of the pixel electrode PE becomes shorter.

Further, while the slit PSL extends along the column direction Y in the example shown, the slit PSL may extend in a direction of inclining by approximately 5°-10° to the column direction Y or may be bent in a V-shape. Furthermore, the slit PSL may extend in the row direction X and may be arranged at intervals in the column direction Y.

Figure 5:
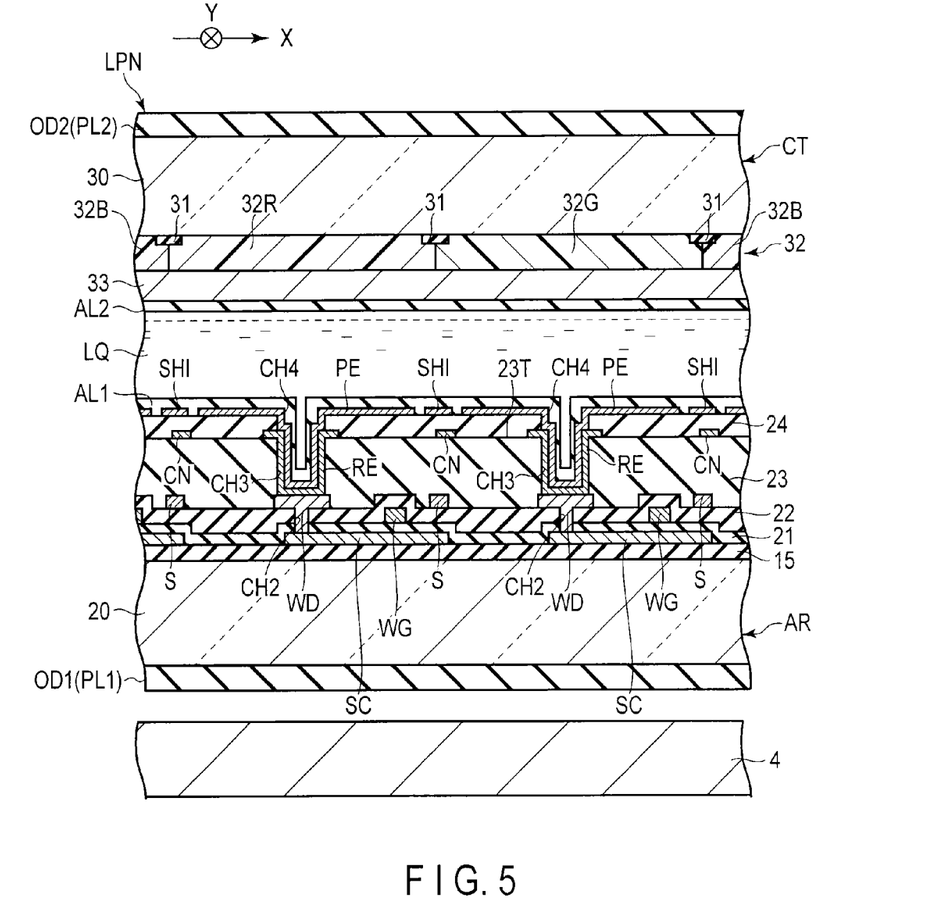
FIG. 5 is a schematic cross-sectional view of the liquid crystal display device along line V-V of FIG. 3.

FIG. 5 is a schematic cross-sectional view of the liquid crystal display device along line V-V of FIG. 3 and is a view schematically illustrating the cross-sectional structure of the contact region of the switching element SW and the pixel electrode PE.

As shown in FIGS. 3-5, the array substrate AR is formed by using a first insulating substrate 20 which has light transmissivity such as a glass substrate.

A first insulating film 15 is formed on the first insulating substrate 20. The switching element SW is formed on the first insulating film 15. The switching element SW shown here is a top-gate thin-film transistor. The semiconductor layer SC is formed on the first insulating film 15. The semiconductor layer SC is covered by a second insulating film 21. Also, the second insulating film 21 is arranged on the first insulating film 15. The second insulating film 21 is formed by using, for example, tetra ethyl ortho silicate (TEOS).

The gate electrode WG of the switching element SW is formed on the second insulating film 21 and located directly on the semiconductor layer SC. The gate electrode WG is covered by a third insulating film 22. Also, the third insulating film 22 is arranged on the second insulating film 21. The third insulating film 22 is formed by a transparent inorganic material, etc., which contains silicon (Si). The third insulating film 22 is formed of silicon oxide (SiO).

The source electrode WS and the drain electrode WD of the switching element SW is formed on the third insulating film 22. The source electrode WS and the drain electrode WD contact the semiconductor layer SC through the contact hole CH1 and a contact hole CH2 which penetrate the second insulating film 21 and the third insulating film 22, respectively. The source line S is also formed on the third insulating film 22.

The source electrode WS, the drain electrode WD and the source line S are formed by using, for example, TAT. "TAT", which stands for Ti (titanium), Al (aluminum) and Ti, is a metal layer of a triple-layer structure.

The source electrode WS, the drain electrode WD and the source line S are covered by a fourth insulating film 23. Also, the fourth insulating film 23 is arranged on the third insulating film 22. The fourth insulating film 23 corresponds to an organic insulating film arranged above the switching element SW and is formed by a transparent organic material. Also, the fourth insulating film 23 has an upper surface 23T which is substantially flat and a contact hole CH3 which penetrates from the upper surface 23T to the drain electrode WD of the switching element SW.

The relay electrode RE is formed in an island shape on the fourth insulating film 23. The relay electrode RE is arranged above the drain electrode WD of the switching element SW. The relay electrode RE is electrically connected to the drain electrode WD through the contact hole CH3. The common electrode CE is formed on the upper surface 23T of the fourth insulating film 23 and is separated from the relay electrode RE.

The relay electrode RE and the common electrode CE are both formed by a transparent conductive material such as indium tin oxide (ITO) and indium zinc oxide (IZO).

The relay electrode RE and the common electrode CE are covered by a fifth insulating film 24. Also, the fifth insulating film 24 is arranged on the fourth insulating film 23. The fifth insulating film 24 corresponds to an interlayer insulating film arranged on the relay electrode RE and the common electrode CE and is formed by a transparent inorganic material containing silicon (Si) such as silicon nitride (SiN). The fifth insulating film 24 is stacked on the fourth insulating film 23 between the common electrode CE (connecting portion CN) and the relay electrode RE. Also, the fifth insulating film 24 has a contact hole CH4. The contact hole CH4 penetrates to the relay electrode RE.

Figure 6:
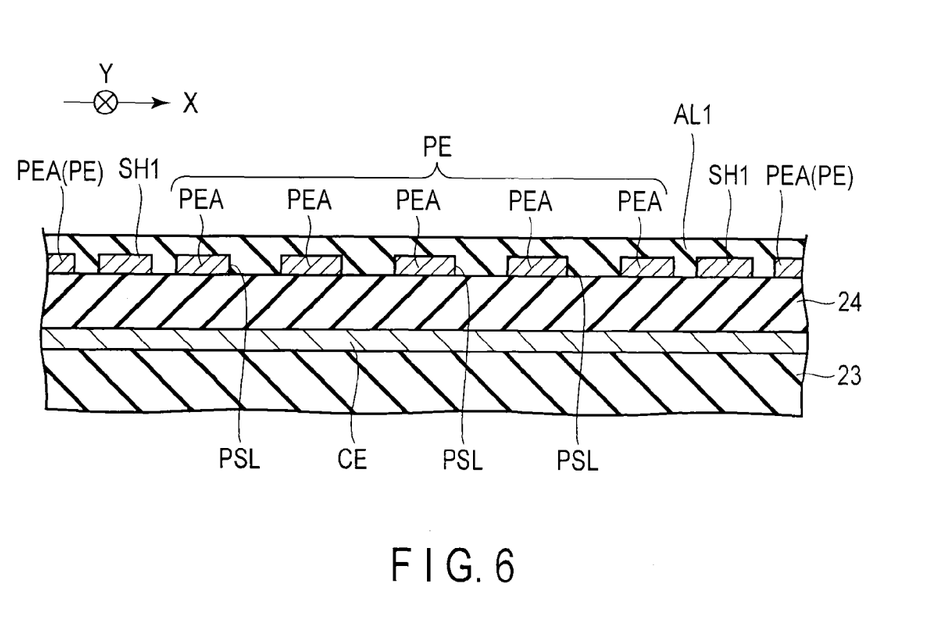
FIG. 6 is a schematic cross-sectional view illustrating a part of the liquid crystal display panel along line VI-VI of FIG. 3.

FIG. 6 is a schematic cross-sectional view illustrating a part of the liquid crystal display device LPN along line VI-VI of FIG. 3.

As shown in FIGS. 3-6, the pixel electrode PE is formed on the fifth insulating film 24 and faces the common electrode CE. Also, the pixel electrode PE is formed on the contact hole CH4 and is stacked on the relay electrode RE in the contact hole CH4. The pixel electrode PE is thereby electrically connected to the relay electrode RE. The plurality of pixel electrodes PEs are located at intervals with each other. The plurality of pixel electrodes PEs are configured to apply to the liquid crystal layer LQ an electric field formed between each pixel electrode PE and the common electrode CE. Also, the pixel electrode PE includes a plurality of electrode portions PEAs which are separated with each other by the slit PSL. In this embodiment, the electrode portion PEA extends in the column direction Y.

The shield electrode SH1 is provided on the fifth insulating film 24. The shield electrode SH1 is located between the pixel electrodes PEs and neighbors the pixel electrodes PEs on both sides, respectively. The shield electrode SH1 extends in a direction parallel to the long axis of the pixel electrode PE (column direction Y). The shield electrode SH1 is provided above a line extending in a direction parallel to the long axis of the pixel electrode PE and faces the line. The shield electrode SH1 is provided above the source line S and faces the source line S. The shield electrode SH1 can shield an undesirable electric field from the pixel electrode PE.

Figure 7:
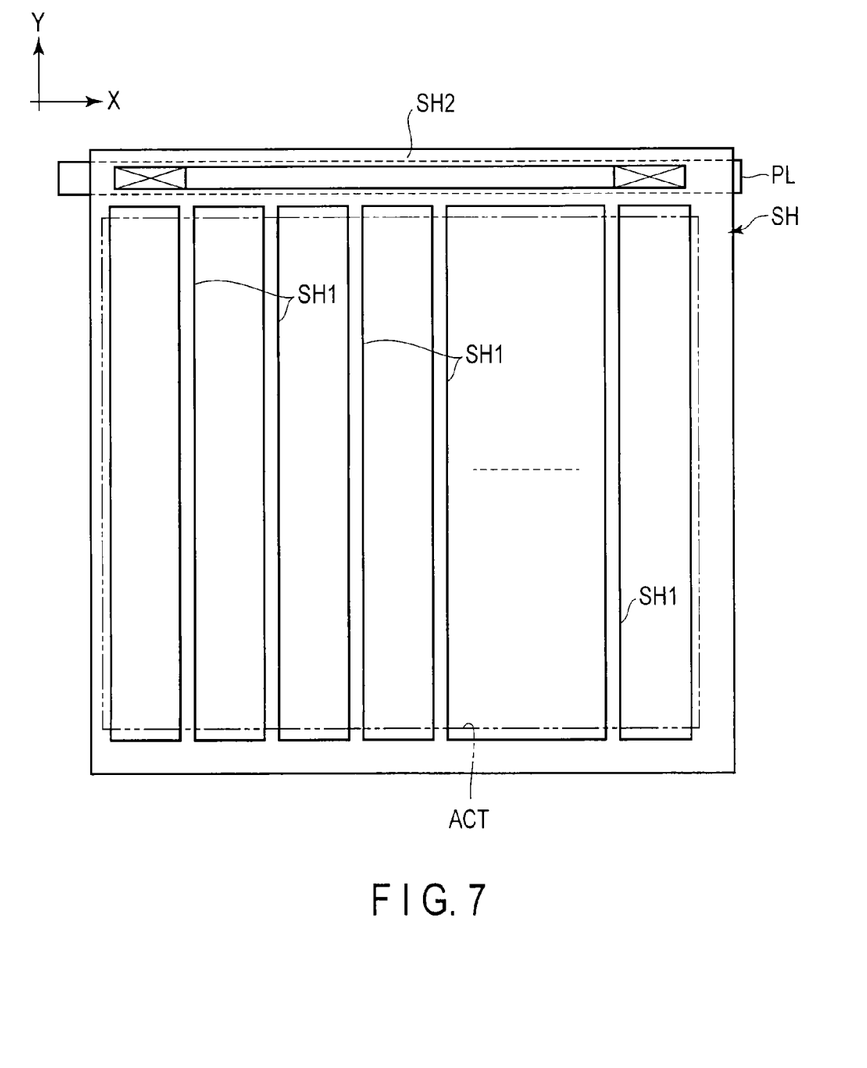
FIG. 7 is a schematic plan view illustrating that a shield section and a voltage line are extracted from the array substrate.

FIG. 7 is a schematic plan view illustrating that a shield portion SH and a voltage line PL are extracted from the array substrate AR.

As shown in FIGS. 4-7, the plurality of shield electrodes SH1 are electrically connected with each other. In this embodiment, the shield electrodes SH1 are formed integrally with a peripheral electrode SH2. The plurality of shield electrodes SH1 and the peripheral electrode SH2 form the shield portion SH.

The peripheral electrode SH2 is located in a non-display region and is formed in a frame shape over the outer circumference of the active area ACT. In this embodiment, since the active area ACT has a rectangular shape, the peripheral electrode SH2 is formed in a rectangular frame shape. One end of the shield electrodes SH1 arranged on the left end and the right end of the active area ACT is connected to the peripheral electrode SH2, respectively. Also, the width of the peripheral electrode SH2 is larger than the width of the shield electrode SH1.

The pixel electrode PE and the shield portion SH are formed by a transparent conductive material such as ITO and IZO. Note that the shield portion SH may be formed by a conductive material which indicates light-blocking effect for metal, etc. In this embodiment, the pixel electrode PE and the shield portion SH are formed by ITO as the same transparent conductive material.

The voltage line PL is located in a non-display region. The voltage line PL is located below the peripheral electrode SH2 and faces the peripheral electrode SH2. The voltage line PL is connected to, for example, the peripheral electrode SH2 on a plurality of points. The voltage line PL is given a constant voltage from, for example, the power source of a constant potential. Therefore, a constant voltage is also given to the shield electrode SH1 (shield portion SH).

The value of the voltage given to the shield electrode SH1 is set to a value that hardly affects crystal liquid alignment. It is desirable that the potential set to the shield electrode SH1 be a positive minute potential (+0.3 to +1.0V). It is thereby possible to show an electric-field shield effect by the shield electrode SH1. Note that if the above-mentioned electric field shield effect can be obtained, the potential of the shield electrode SH1 is not limited to the above-mentioned value but can be modified to any value.

Also, the potential of the shield electrode SH1 (shield portion SH) may not be fixed to a constant potential but may be controlled to an optional potential. For example, the shield electrode SH1 may be further given a bias voltage corresponding to the respective voltage values of the pixel electrodes PEs neighboring with each other, by using the voltage line PL, etc.

Further, it is desirable that the potential of the shield electrode SH1 be set to a potential having the same polarity as the potential of the pixel electrode PE. For example, when polarity inversion drive is performed for the pixel electrode PE, it is desirable that the potential of the shield electrode SH1 be adjusted to a potential having the same polarity as the potential of the pixel electrode PE. In the case of frame inversion drive, the shield electrode SH1 is set alternately to a positive minute potential and a negative minute potential per frame.

The pixel electrode PE and the shield portion SH are covered by a first alignment film ALL The first alignment film AL1 is arranged on a surface which contacts the liquid crystal layer LQ of the array substrate AR.

On the other hand, as shown in FIG. 5, the counter-substrate CT is formed by using a second insulating substrate 30 which has light transmissivity such as a glass substrate. The counter-substrate CT comprises, on the inner surface of the second insulating substrate 30 (i.e., a surface which faces the array substrate AR), a black matrix 31 which partitions each pixel PX, a color filter 32, an overcoat layer 33, etc.

On the inner surface of the second insulating substrate 30, the black matrix 31 is formed so as to face a wiring portion such as the gate line G, the source line S and the switching element SW which are provided on the array substrate AR. The color filter 32 is formed on the inner surface of the second insulating substrate 30 and is formed by colored layers 32R, 32G, 32B which are colored in a plurality of colors which differ from each other such as three primary colors of red, blue and green, respectively. The red-colored layer 32R is arranged corresponding to a red pixel. Similarly, the blue-colored layer 32B is arranged corresponding to a blue pixel and the green layer 32G is arranged corresponding to a green pixel. The colored layers 32R, 32G and 32B extend in the column direction Y and are sequentially arranged in the row direction X.

Therefore, a pair of pixels PXs which neighbor with each other in the row direction X is configured to display images whose color differ from each other. The plurality of pixels PXs arranged in the same column are configured to display images whose color is the same.

The overcoat layer 33 is formed on the black matrix 31 and the color filter 32. The overcoat layer 33 flattens the asperities of the counter-substrate CT. The overcoat layer 33 is covered by a second alignment film AL2. The second alignment film AL2 is arranged on a surface which contacts the liquid crystal layer LQ of the counter-substrate CT.

The above-mentioned array substrate AR and counter-substrate CT are arranged so that the first alignment film AL1 and the second alignment film AL2 face with each other. A gap between the array substrate AR and the counter-substrate CT is held by spacers. The array substrate AR and the counter-substrate CT are bonded by a sealing member, with a predetermined gap formed. The liquid crystal layer LQ is configured by a liquid crystal which includes a liquid crystal molecule enveloped in a space encircled by the array substrate AR, the counter-substrate CT and the sealing member.

A first optical element OD1 which includes a first polarizer PL1 is arranged on one outer surface of the liquid crystal display panel LPN, i.e., on the outer surface of the first insulating substrate 20 which constitutes the array substrate AR. Also, a second optical element OD2 which includes a second polarizer PL2 is arranged on the other outer surface of the liquid crystal display panel LPN, i.e., on the outer surface of the second insulating substrate 30 which constitutes the counter-substrate CT.

Alignment treatment is performed for the first alignment film AL1 and the second alignment film AL2 in an X-Y plane in the same orientation. Therefore, initial alignment is performed for a liquid crystal molecule included in the liquid crystal layer LQ in the X-Y plane in the alignment treatment orientations of the first alignment film AL1 and the second alignment film AL2, in a state where an electric field is not formed between the pixel electrode PE and the common electrode CE. A liquid crystal molecule is aligned in an orientation which differs from the initial alignment orientation in the X-Y plane, in a state where a fringe electric field is formed between the pixel electrode PE and the common electrode CE.

Figure 8:
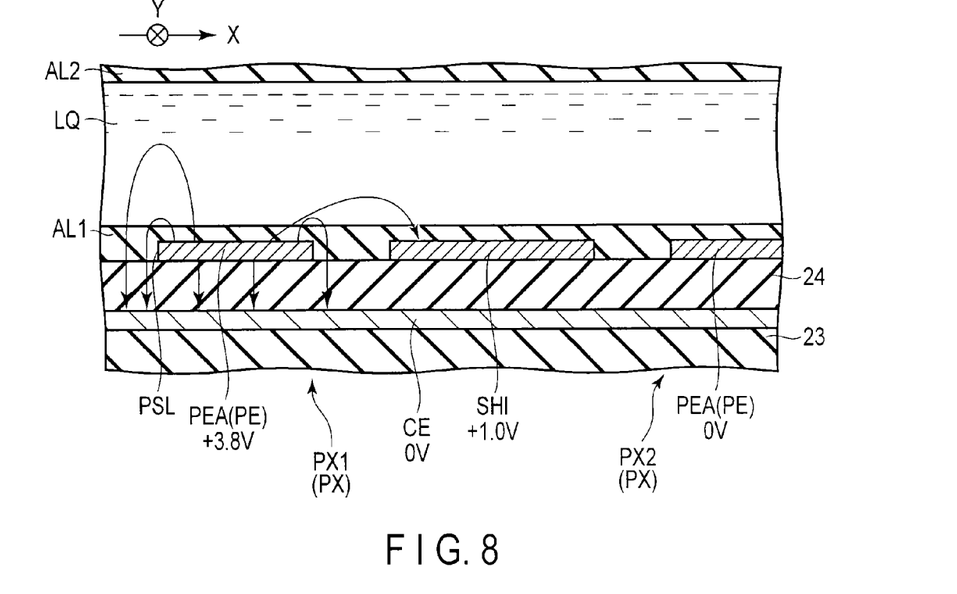
FIG. 8 is a cross-sectional view illustrating a part of the liquid crystal display panel of the first embodiment and is a view for describing an example of an electric field applied to a liquid crystal layer when a first pixel is in an on-state and a second pixel is in an off-state.

Next, a normal electric field formed between the common electrode CE and the pixel electrode PE will be described. FIG. 8 is a cross-sectional view illustrating a part of the liquid crystal display panel LPN of the first embodiment and is a view for describing an example of an electric field applied to the liquid crystal layer LQ when the first pixel PX1 is in an on-state and the second pixel PX2 is in an off-state.

As shown in FIG. 8, a predetermined voltage is applied between the common electrode CE and the pixel electrode PE in the first pixel PX1 in an on-state. Then, an electric field is generated not only in a region where both electrodes face with each other but also in a region of the liquid crystal layer LQ which faces the slit PSL (this is called a fringe electric field). In a liquid crystal display device which utilizes an FFS mode, a fringe electric field is applied to the first crystal liquid layer of the first pixel PX1, and the alignment direction of a liquid crystal molecule is controlled by this fringe electric field.

Next, a result of simulating whether the shield electrode SH1 shields an undesirable electric field from the pixel electrode PE in the liquid crystal display device of the present embodiment will be described.

As shown in FIG. 8, the simulation is performed by setting the potential of the common electrode CE to 0V, the potential of the pixel electrode PE of the first pixel PX1 to +3.8V, the potential of the pixel electrode PE of the second pixel PX2 to +0V, and the potential of the shield electrode SH1 to +1.0V, respectively, to derive the light transmittance of the second pixel PX2. Note that the first pixel PX1 is in an on-state and the second pixel PX2 is in an off-state. Also, the first pixel PX1 is defined as a pixel which displays red and the second pixel PX2 is defined as a pixel which displays green. This is because non-uniformity in color mixture is easily seen in single-color red raster display.

The light transmittance of the second pixel PX2 is in an off-state was derived to be 0.7%. A value close to 0%, which is a desirable light transmittance, was gained. This is because an electric field was formed between the pixel electrode PE of the first pixel PX1 and the shield electrode SH1 and an undesirable electric field from the pixel electrode PE was shielded by the shield electrode SH1. In other words, this is because an electric field became less likely to be leaked from the first pixel PX1 to the second liquid crystal layer of the second pixel PX2.

Figure 9:
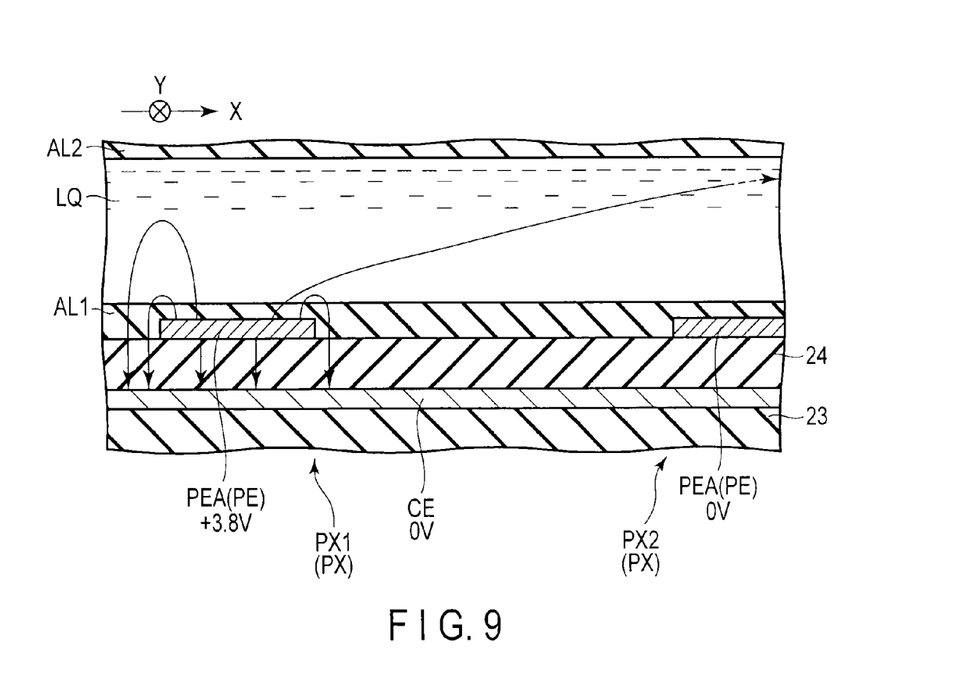
FIG. 9 is a cross-sectional view illustrating a part of the liquid crystal display panel of a comparative example and is a view for describing an example of an electric field applied to the liquid crystal layer when the first pixel is in an on-state and the second pixel is in an off-state.

Next, in order to compare with the present embodiment, a liquid crystal display device of a comparative example was prepared to derive the light transmittance of the second pixel PX2. FIG. 9 is a cross-sectional view illustrating a part of the liquid crystal display panel LPN of the comparative example and is a view for describing an example of an electric field applied to the liquid crystal layer LQ when the first pixel PX1 is in an on-state and the second pixel PX2 is in an off-state.

As shown in FIG. 9, the liquid crystal display device of the comparative example is formed in the same way as the liquid crystal display device of the present embodiment, except that the shield electrode SH1 (shield portion SH) is not provided in the liquid crystal display device of the comparative example. Also, the light transmittance of the second pixel PX2 was derived in the same way as the liquid crystal display device of the present embodiment (common electrode CE=0V, the pixel electrode PE of the first pixel PX1=+3.8V, the pixel electrode PE of the second pixel PX2=0V).

The light transmittance of the second pixel PX2 in an off-state was derived to be 5.6%. This is because the above-mentioned shield electrode SH1 which could form an electric field between the pixel electrode PE of the first pixel PX1 and the shield electrode SH1 did not exist and because an undesirable electric field from the pixel electrode PE could not be shielded. In other words, this is because an electric field was leaked from the first pixel PX1 to the second liquid crystal layer of the second pixel PX2.

The comparison between the above-mentioned two light transmittances reveals that the light transmittance of the second pixel PX2 of the present embodiment is one-eighth of the light transmittance of the second pixel PX2 of the comparative example. It can be understood therefrom that light leakage from the second pixel PX2 in an off-state decreased to one-eighth by adding the shield electrode SH1.

According to the liquid crystal display device of the first embodiment constituted as above, the liquid crystal display device comprises the array substrate AR, the counter-substrate CT and the liquid crystal layer LQ, and uses an FFS mode. The array substrate AR comprises the common electrode CE, the fifth insulating film 24 which is provided on the common electrode CE, the first pixel electrode PE, the second pixel electrode PE and the shield electrode SH1 which are provided on the fifth insulating film 24. The first pixel electrode PE and the second pixel electrode PE are located at intervals with each other. The shield electrode SH1 is located between the first pixel electrode PE and the second pixel electrode PE and neighbors the first pixel electrode PE and the second pixel electrode PE, respectively. The first pixel electrode PE and the second pixel electrode PE are configured to apply to the liquid crystal layer LQ an electric field formed between each pixel electrode PE and the common electrode CE.

Since the liquid crystal display device comprises the shield electrode SH1, an electric field is less likely to be leaked from the first pixel PX1 in an on-state to the second pixel PX2. Therefore, it is possible to reduce the alignment disturbance of the second liquid crystal layer of the second pixel PX2 which is caused by the drive of the first pixel PX1. Since the liquid crystal display device of the present embodiment is a normally black liquid crystal display device, it is possible to reduce light leakage in the second pixel PX2 in an off-state. Further, in the present embodiment, it is possible to reduce the occurrence of non-uniformity in color mixture since the first pixel PX1 and the second pixel PX2 display images whose color differs from each other.

From the above, it is possible to mitigate the restriction on the pixel electrode PE and to obtain a liquid crystal display device excellent in display quality without decreasing the definition of the pixel PX and impairing the advantage of an FFS mode.

Figure 10:
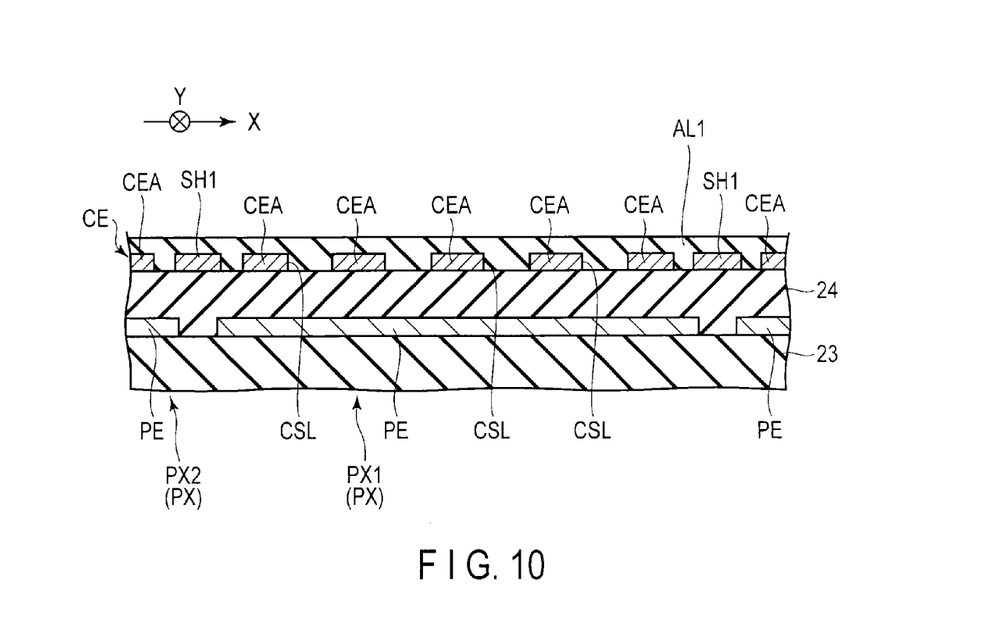
FIG. 10 is a view for describing a liquid crystal display device of a second embodiment and is a schematic cross-sectional view illustrating a part of a liquid crystal display panel.

Next, a liquid crystal display device of a second embodiment will be described. FIG. 10 is a view for describing the liquid crystal display device of the present embodiment and is a schematic cross-sectional view illustrating a part of the liquid crystal display panel LPN.

As shown in FIG. 10, the liquid crystal display device of the present embodiment is a liquid crystal display device which utilizes an FFS mode and is formed in the same way as the liquid crystal display device of the above-mentioned first embodiment, except that the locations of the pixel electrode PE and the common electrode CE are inversed.

In this embodiment, the pixel electrode PE is located below the common electrode CE. The pixel electrode PE is formed without the above-mentioned slit PSL. In this embodiment, the plurality of pixel electrodes PEs are also provided in an island shape.

The relay electrode RE can be used for relaying the common electrode CE and the above-mentioned voltage line PL, not for relaying the pixel electrode PE and the semiconductor layer SC.

The plurality of slits PSLs which face the pixel electrode PE are formed in the common electrode CE. In the example shown, four slits CSLs are formed in the common electrode CE in a region which faces one pixel electrode PE. Note that the number, size and shape of the slit CSL can be modified to any ones, respectively.

The common electrode CE includes a plurality of electrode portions CEAs which are separated with each other by the slit CSL. Note that the plurality of electrode portions CEAs are set to the same potential. In this embodiment, the electrode portion CEA extends in the column direction Y. Each pixel uses five electrode portions CEAs.

The electrode portion CEA which faces the first pixel electrode PE of the first pixel PX1 is referred to as a first electrode portion CEA and the electrode portion CEA which faces the second pixel electrode PE of the second pixel PX2 is referred to as a second electrode portion CEA. The first pixel electrode PE is configured to apply to the liquid crystal layer LQ (first liquid crystal layer) an electric field formed between the first pixel electrode PE and the first electrode portion CEA. The second pixel electrode PE is configured to apply to the liquid crystal layer LQ (second liquid crystal layer) an electric field formed between the second pixel electrode PE and the second electrode portion CEA.

The shield electrode SH1 (shield portion SH) is provided in a layer of the same level as the common electrode CE. Regarding the shield electrode SH1 between the first pixel PX1 and the second pixel PX2, the shield electrode SH1 is located between the first electrode portion CEA and the second electrode portion CEA and neighbors the first electrode portion CEA and the second electrode portion CEA, respectively. In this embodiment, the common electrode CE and the shield portion SH are formed by ITO as the same transparent conductive material.

According to the liquid crystal display device of the second embodiment constituted as above, the liquid crystal display device comprises the array substrate AR, the counter-substrate CT and the liquid crystal layer LQ, and uses an FFS mode. The array substrate AR comprises the first pixel electrode PE, the second pixel electrode PE, the fifth insulating film 24, the common electrode CE and the shield electrode SH1.

The first pixel electrode PE and the second pixel electrode PE are provided in a layer of the same level and are located at intervals with each other. The fifth insulating film 24 is provided on the first pixel electrode PE and the second pixel electrode PE.

The common electrode CE is provided on the fifth insulating film 24 and includes the first electrode portion CEA and the second electrode portion CEA. The first electrode portion CEA faces the first pixel electrode PE and the second electrode portion CEA faces the second pixel electrode PE.

The shield electrode SH1 is provided in a layer of the same level as the common electrode CE, is located between the first electrode portion CEA and the second electrode portion CEA, and neighbors the first electrode portion CEA and the second electrode portion CEA, respectively.

In the first pixel PX, the first pixel electrode PE is configured to apply to the liquid crystal layer LQ (first liquid crystal layer) an electric field formed between the first pixel electrode PE and the first electrode portion CEA. In the second pixel PX, the second pixel electrode PE is configured to apply to the liquid crystal layer LQ (second liquid crystal layer) an electric field formed between the second pixel electrode PE and the second electrode portion CEA.

In the liquid crystal display device of the present embodiment, it is possible to obtain the same effect as the effect obtained in the above-mentioned first embodiment since the liquid crystal display device of the present embodiment comprises the shield electrode SH1.

From the above, it is possible to mitigate the restriction on the pixel electrode PE and to obtain a liquid crystal display device excellent in display quality without decreasing the definition of the pixel PX and impairing the advantage of an FFS mode.

Figure 11:
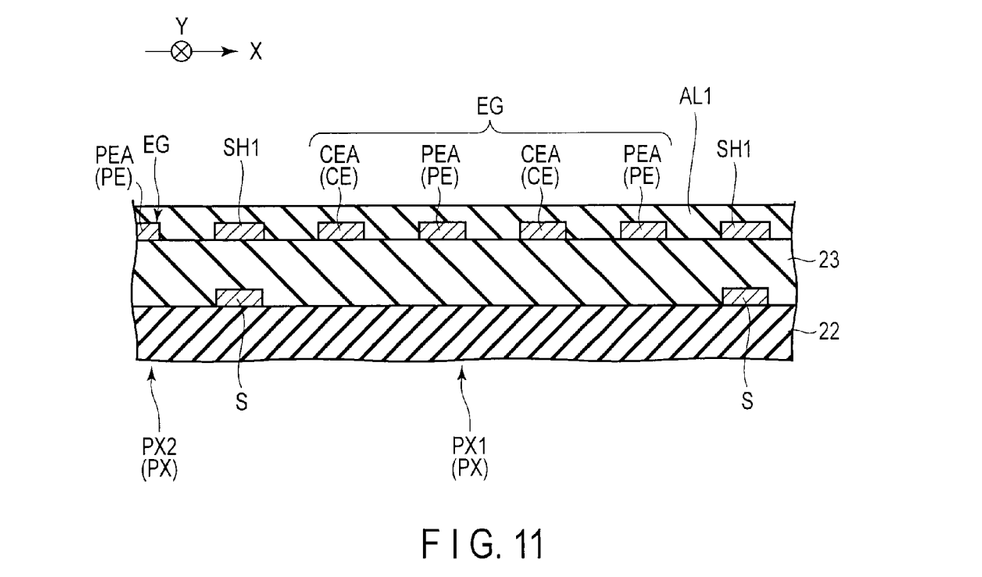
FIG. 11 is a view for describing a liquid crystal display device of a third embodiment and is a schematic cross-sectional view illustrating a part of a liquid crystal display panel.

Next, a liquid crystal display device of a third embodiment will be described. FIG. 11 is a view for describing the liquid crystal display device of the present embodiment and is a schematic cross-sectional view illustrating a part of the liquid crystal display panel LPN.

As shown in FIG. 11, the liquid crystal display device of the present embodiment is a liquid crystal display device which utilizes an IPS mode and is formed in the same way as the liquid crystal display devices of the above-mentioned embodiments, except that the pixel electrode PE and the common electrode CE are located in a layer of the same level. Note that the liquid crystal display device of the present embodiment is formed without the above-mentioned relay electrode RE and fifth insulating film 24.

The first pixel electrode PE of the first pixel PX1 and the second pixel electrode PE of the second pixel PX2 are provided in a layer of the same level and are located at intervals with each other. The common electrode CE is provided in a layer of the same level as the pixel electrode PE and includes the first electrode portion CEA and the second electrode portion CEA, which are set to the same potential.

A first electrode group EG of the first pixel PX1 includes the first pixel electrode PE and the first electrode portion CEA. A second electrode group EG of the second pixel PX2 includes the second pixel electrode PE and the second electrode portion CEA. The first pixel electrode PE is configured to apply to the liquid crystal layer LQ (first liquid crystal layer) an electric field formed between the first pixel electrode PE and the first electrode portion CEA. The second pixel electrode PE is configured to apply to the liquid crystal layer LQ (second liquid crystal layer) an electric field formed between the second pixel electrode PE and the second electrode portion CEA.

The shield electrode SH1 (shield portion SH) is provided in a layer of the same level as the pixel electrode PE and the common electrode CE. The pixel electrode PE, the common electrode CE and the shield electrode SH1 are provided on the fourth insulating film 23.

Regarding the shield electrode SH1 between the first pixel PX1 and the second pixel PX2, the shield electrode SH1 is located between the first electrode group EG and the second electrode group EG and neighbors the first electrode group EG and the second electrode group EG, respectively. In this embodiment, the pixel electrode PE, the common electrode CE and the shield portion SH are formed by ITO as the same transparent conductive material.

The pixel electrode PE, the common electrode CE and the shield electrode SH1 should be located separately with each other and be formed so as to be electrically insulated.

For example, in this embodiment, the shield portion SH is formed without the peripheral electrode SH2 which has a rectangular frame shape. The shield portion SH is formed in a comb shape, a part of which is formed by the shield electrode SH1. The pixel electrode PE and the common electrode CE are also formed in a comb shape, respectively.

According to the liquid crystal display device of the third embodiment constituted as above, the liquid crystal display device comprises the array substrate AR, the counter-substrate CT and the liquid crystal layer LQ, and uses an IPS mode. The array substrate AR comprises the first pixel electrode PE, the second pixel electrode PE, the common electrode CE and the shield electrode SH1.

The first pixel electrode PE, the second pixel electrode PE, the common electrode CE and the shield electrode SH1 are provided in a layer of the same level and are located at intervals with each other. The common electrode CE includes the first electrode portion CEA and the second electrode portion CEA, which are set to the same potential.

The first pixel electrode PE and the first electrode portion CEA, which are alternately arranged, form the first electrode group EG. Also, the second pixel electrode PE and the second electrode portion CEA, which are alternately arranged, form the second electrode group EG. The shield electrode SH1 is located between the first electrode group EG and the second electrode group EG and neighbors the first electrode group EG and the second electrode group EG, respectively.

In the first pixel PX, the first pixel electrode PE is configured to apply to the liquid crystal layer LQ (first liquid crystal layer) an electric field formed between the first pixel electrode PE and the first electrode portion CEA. In the second pixel PX, the second pixel electrode PE is configured to apply to the liquid crystal layer LQ (second liquid crystal layer) an electric field formed between the second pixel electrode PE and the second electrode portion CEA.

In the liquid crystal display device of the present embodiment, it is possible to obtain the same effect as the effects obtained in the above-mentioned embodiments since the liquid crystal display device of the present embodiment comprises the shield electrode SH1.

From the above, it is possible to mitigate the restriction on the pixel electrode PE and to obtain a liquid crystal display device excellent in display quality without decreasing the definition of the pixel PX and impairing the advantage of an IPS mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, while the shield electrode SH1 is formed so as to extend in the column direction Y, it is not limited thereto. The shield electrode SH1 can be modified in various forms. The shield electrode SH1 may be formed so as to extend in the row direction X or may be formed so as to extend in the column direction Y and the row direction X. Since it is thereby possible to make the shield electrode SH1 exist in the pixels PX which neighbor in the column direction Y, it is possible to inhibit electric field leakage of the column direction Y.

The shield electrode SH1 may be configured to be provided only between specific pixels based on the conspicuousness of color mixture and the restriction on the size and layout of each pixel. For example, it is possible to be configured to provide the shield electrode SH1 only between a pixel which displays red and a pixel which displays green and not to provide the shield electrode SH1 between a pixel which displays green and a pixel which displays blue or between a pixel which displays blue and a pixel which displays red.

As a potential set to the shield electrode SH1, a common potential or a minute potential (+0.3 to +1.0V) adjusted based on a common potential may be used.

While the pixel electrode PE of the first embodiment is constituted by providing a slit to a rectangular conductive film, the structure of the pixel electrode PE is not particularly limited. A pixel electrode may be constituted by a frame-shape conductive film and may have only one slit. Also, a pixel electrode may be constituted by one narrow electrode and may not have a slit.

The liquid crystal display panel LPN is not limited to a normally black liquid crystal display panel but may be a normally white liquid crystal display panel. In this case, the similar effect to the above-mentioned embodiments can also be gained.

In the present embodiments, while a liquid crystal display device which utilizes the IPS mode including the FFS mode has been exemplified, it is possible to take as its application example a liquid crystal display device which utilizes each type of IPS mode. Also, there is no need to mention that the liquid crystal display devices of the present embodiments are applicable to from small to large sizes, without any limitation.

What is claimed is:

1. A liquid crystal display device comprising:
an array substrate comprising a plurality of gate lines, a plurality of source lines, an organic insulation film provided on the gate lines and source lines, a common electrode provided on the organic insulation film, an insulating film provided on the common electrode, a plurality of pixel electrodes provided on the insulating film, and a shield electrode provided in a same layer as the pixel electrodes;
a counter-substrate arranged opposite to the array substrate; and
a liquid crystal layer held between the array substrate and the counter-substrate,
wherein
the array substrate, the counter-substrate, and the liquid crystal layer form a plurality of pixels in a matrix arranged in a row direction and a column direction,
the pixels comprise a first pixel including a first pixel electrode and a second pixel including a second pixel electrode adjacent to the first pixel via one of the source lines,
the common electrode is formed continuously over the first pixel and the second pixel and overlaps the source lines,
the shield electrode is disposed between the first pixel electrode and the second pixel electrode, and overlaps the one of the source lines and the common electrode,
the first pixel electrode, the second pixel electrode, and the shield electrode are formed by a same transparent conductive material, and
a voltage applied to the shield electrode and a voltage applied to each of the first pixel electrode and the second pixel electrode are different from each other.

2. The liquid crystal display device of claim 1, wherein the first pixel electrode and the second pixel electrode have a long axis parallel to each other, and the shield electrode extends in a direction parallel to the long axis.

3. The liquid crystal display device of claim 2, wherein the source lines extend in a direction parallel to the long axis.

4. The liquid crystal display device of claim 1, wherein a pair of pixels neighboring with each other in the row direction among the pixels are configured to display images of colors different from each other.

5. The liquid crystal display device of claim 1, wherein the shield electrode is given a constant voltage.

6. The liquid crystal display device of claim 5, wherein the shield electrode is further given a bias voltage corresponding to each voltage value of the first pixel electrode and the second pixel electrode.

7. The liquid crystal display device of claim 1, wherein the array substrate further comprises a peripheral electrode in a non-display region and a plurality of shield electrodes including the shield electrode, and the shield electrodes are connected to each other by the peripheral electrode.

8. The liquid crystal display device of claim 7, wherein a width of the peripheral electrode is larger than a width of each of the shield electrodes.

* * * * *